United States Patent
Wieland et al.

(10) Patent No.: US 9,503,707 B2
(45) Date of Patent: Nov. 22, 2016

(54) METHOD FOR ALIGNING A 3-D CAMERA, METHOD FOR CONTROLLING A 3-D CAMERA DURING FILMING AND CAMERA RIG HAVING TWO CAMERAS

(76) Inventors: Christian Wieland, Augsburg (DE); Robert Siegl, Mering (DE); Martin Borchert, Kissing (DE); Steven J. Schklair, Altadena, CA (US)

( * ) Notice: Subject to any disclaimer, the term of this patent is extended or adjusted under 35 U.S.C. 154(b) by 511 days.

(21) Appl. No.: 14/009,793

(22) PCT Filed: Mar. 8, 2012

(86) PCT No.: PCT/EP2012/001036
§ 371 (c)(1),
(2), (4) Date: Apr. 18, 2014

(87) PCT Pub. No.: WO2012/136300
PCT Pub. Date: Oct. 11, 2012

(65) Prior Publication Data
US 2014/0225989 A1  Aug. 14, 2014

(30) Foreign Application Priority Data
Apr. 5, 2011 (DE) .................. 10 2011 016 171

(51) Int. Cl.
*H04N 13/02* (2006.01)
*G03B 35/08* (2006.01)

(52) U.S. Cl.
CPC .......... *H04N 13/0246* (2013.01); *G03B 35/08* (2013.01); *H04N 13/0239* (2013.01)

(58) Field of Classification Search
CPC ...................... H04N 13/0296; H04N 13/0246; H04N 13/0239; G03B 35/08
See application file for complete search history.

(56) References Cited

U.S. PATENT DOCUMENTS

| | | | |
|---|---|---|---|
| 4,418,993 A | 12/1983 | Lipton | |
| 5,625,408 A | 4/1997 | Matsugu et al. | |
| 6,320,610 B1 * | 11/2001 | Van Sant | G02B 26/10 348/143 |
| 6,326,995 B1 | 12/2001 | Palm et al. | |
| 7,611,293 B2 * | 11/2009 | Lee | F16M 11/42 280/47.11 |
| 7,652,251 B1 * | 1/2010 | King | G02B 23/12 250/332 |
| 2005/0053274 A1 * | 3/2005 | Mayer | G03B 21/18 382/154 |
| 2010/0239240 A1 | 9/2010 | Cameron et al. | |
| 2011/0069151 A1 | 3/2011 | Orimoto | |

FOREIGN PATENT DOCUMENTS

| | | |
|---|---|---|
| EP | 01 46 476 | 12/1984 |
| EP | 1 383 342 | 7/2003 |
| WO | WO 02/073980 | 9/2002 |

OTHER PUBLICATIONS

International Search Report for PCT/EP2012/001036 in 3 pages.
International Search Report for PCT/EP2012/001035 in 2 pages.

* cited by examiner

*Primary Examiner* — Jay Patel
*Assistant Examiner* — Neil Mikeska
(74) *Attorney, Agent, or Firm* — Knobbe, Martens, Olson & Bear, LLP

(57) ABSTRACT

A method of aligning the optical axes of two cameras, wherein the cameras are parts of a camera apparatus and the two cameras can be used for producing 3D films, wherein plural steps are automatically run through. The invention also relates to a method of controlling a camera rig comprising two cameras for producing 3D films according to the table of values according to such method, wherein during shooting upon zooming at least one camera is automatically moved via camera motors. The invention also relates to a camera rig comprising two cameras that are preferably juxtaposed or superimposed having a control which realizes a method as explained.

12 Claims, 2 Drawing Sheets

METHOD FOR ALIGNING A 3-D CAMERA, METHOD FOR CONTROLLING A 3-D CAMERA DURING FILMING AND CAMERA RIG HAVING TWO CAMERAS

FIELD OF THE INVENTION

The invention relates to a method of aligning the optical axes of two cameras, the cameras being parts of a camera apparatus, the cameras having a total of at least four degrees of freedom and the two cameras being adapted to be used for producing 3D films, wherein plural steps are run through.

From the state of the art camera rigs provided for filming high-quality films, e.g. for cinema screening, are known. Furthermore camera apparatuses, also referred to as camera rigs, are known which make simultaneous use of two cameras. In this case either one of the cameras is arranged above the other or next to the other, in both cases the optical axes of the cameras being intended to be movable so that they are horizontally juxtaposed. Frequently also a mirror arrangement is used.

In these camera apparatuses films inducing a three-dimensional effect to the viewer in the cinema are recorded. In the case of these 3D films as they are called it is of great importance, however, that the two cameras are exactly aligned relative to each other with respect to their optical axes. Unfortunately there are numerous factors resulting in the presence of deviations between the two cameras in response to the respective focal length, i.e. the zoom value. During filming this results in undesired effects for the spectator.

Therefore, it is endeavored to achieve an exact alignment of the optical axes at every instance in 3D camera apparatuses. Conventionally this is also referred to as "alignment". However, so far the two cameras have been "aligned" with respect to each other, i.e. the optical axes are exactly aligned relative to each other, manually by an operator before a respective scene is shot.

Thus it is the object of the present invention to provide an improvement exactly in this respect. The operation of a 3D camera rig by fewer operators is to be achieved while simultaneously obtaining a better result for the spectator.

According to the invention this is achieved by the fact that plural steps are run through.

These are the steps of:
a) Setting a first focal length for a first particular zoom value at both cameras,
b) Roughly aligning the two cameras to a first arbitrarily chosen first image section with a high-contrast and diverse environment surrounding the cameras.
c) Automatically comparing the pixels contained in the first image section of the images obtained by the two cameras to each other and controlling motors connected to the cameras so that at least an alignment of the cameras along a vertical axis and/or a horizontal axis and/or in accordance with a rotation about one axis or both axes results in resembling images, as well as detecting and storing the achieved alignment of the two cameras in the case of resembling images as well as aligning the two cameras to a second image section which is closer to or more distant from the first image section to the cameras, while automatically comparing the pixels contained in the second image section of the images obtained by the two cameras to each other and controlling motors connected to the cameras so that at least an alignment of the cameras along a vertical axis and/or a horizontal axis and/or in accordance with a rotation about one axis or both axes results in resembling images, as well as detecting and storing the achieved alignment of the two cameras in the case of resembling images,
d) Re-aligning the cameras to another image section which is identical to the first and/or second image section or differs from the same, at a second focal length which is different from the first focal length, and
e) Repeatedly carrying out step c).

By rough aligning a selection of an image section is understood so that this image section represents a high-contrast and diverse pixel arrangement.

The individual steps of the method are to be successively run through, especially the steps a), b), c), d) and e) are to be run through in this order. However, it is also possible that the individual steps are run through in a different order.

In this way a computer-controlled proceeding can be chosen so as to obtain "auto-alignment". In this manner, an auto-alignment can be carried out immediately before shooting a specific scene or simultaneously with the start of shooting the scene. Accordingly, operation of the 3D camera rig by a person instructed to this job can be dispensed with. Thus the shooting of 3D films is not only facilitated but also is quicker and less expensive. Furthermore the quality is improved.

Advantageous embodiments are claimed in the subclaims and will be explained in detail hereinafter.

It is of advantage when a step of the method comprises identifying individual recognizable pixels which are combined into features. The features mark characteristic details in the respective image section.

It is also advantageous when a "Harris detector" is used.

For an especially reliable operation of the method it is beneficial when the found image details are specified by descriptors including additional information, wherein they are advantageously provided in the form of vectors and matrices for calculating and comparing the features in both images obtained by the cameras.

It is of advantage when the descriptors of the two images are compared to each other. The result of the method is also improved in this way.

When, upon exceeding a limit of inaccuracy at which a maximum deviation between the two descriptors is exceeded, the allocation of the respective feature of the two image sections is refused and a new allocation with respect to the two image sections is chosen, rough false estimations are prevented from deteriorating the method.

In order to obtain stable and valid results, it is advantageous when a RANSAC technique is used for refusal. In particular, it is possible to carry out the previously taken steps equally using RANSAC.

Another advantageous embodiment is characterized in that the error in alignment in the at least four degrees of freedom after the overall correction in step c) is stored in a storage unit.

In order to provide for the later use of individual results it is of advantage when a step for determining a zero position in which deviations along the linear vertical axis, the linear horizontal axis as well as with respect to a rotation about each of the two axes are detected is provided. The movement of the cameras is linear along the vertical axis and along the horizontal axis, wherein the vertical axis is aligned orthogonally to the horizontal axis. The term "pitch" relates to pivoting the camera(s) about the (respective) horizontal axis.

In order to improve the versatile applicability of the method, it is of advantage when a table of values of the absolute values established in step c) is stored or in the table of values a difference of the values established in step c) from the respective zero position is stored.

The invention also relates to a method of controlling a camera rig including two cameras for producing 3D films according to the table of values as explained in the foregoing, wherein during shooting upon zooming at least one camera is automatically moved via camera motors.

It has turned out to be beneficial when a total of four motors are used, wherein two motors at a time form a unit so that a "height/pitch unit" and a "horizontal-compensation unit" are provided.

Furthermore, the invention relates to a camera rig including two cameras which are preferably juxtaposed or superimposed, comprising a control for realizing a method as explained in the foregoing. When the two cameras are superimposed, the upper camera is rotated with respect to the lower camera by 90° about a horizontal axis, wherein a mirror is arranged substantially between the two cameras, namely such that the two optical axes of the two cameras extend through the mirror which is configured to be semi-transparent. One optical axis is deflected, whereas the other optical axis is not deflected by the mirror. The two optical axes can be aligned with each other. In order to obtain the 3D effect the two axes are horizontally offset against each other, however.

Hereinafter the invention will be illustrated in detail also with the aid of a drawing in which.

Figure 1:
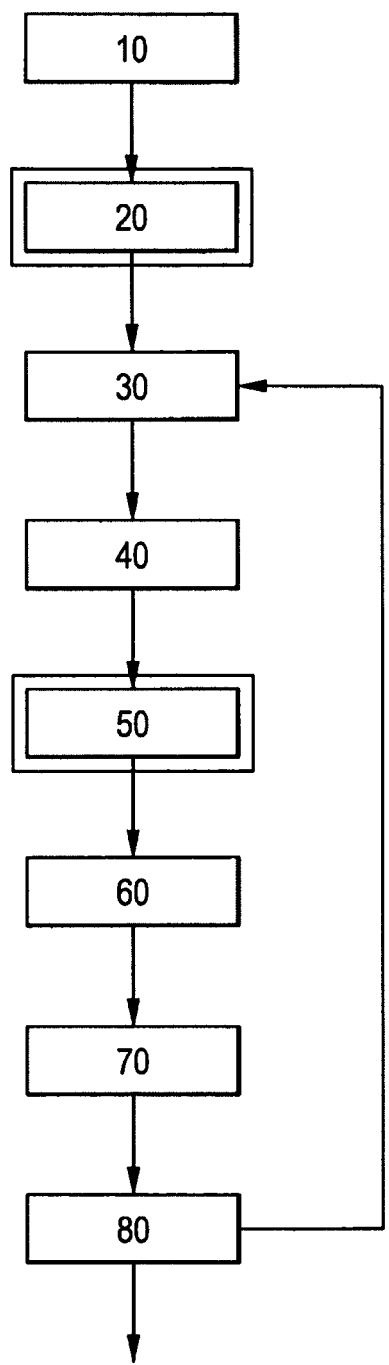
FIG. 1 shows a flow chart of a method according to the invention.

In FIG. 1 in a first step 10 a waiting loop for a background image is provided. In a subsequent step 20 a calibrating movement is performed. It is understood by a calibrating movement to control motors acting on the cameras so that the image sections provided by the cameras are changing. In doing so the ratio of the displacement of the pixels in the image to the motor movement performed is calculated. This can be used to obtain an especially good control.

In step 30 following step 20 a background control step is carried out. In such background control step the background error is minimized by means of a pitch movement, i.e. in this case horizontally as well as vertically, however.

In a subsequent step 40 a foreground image is waited for.

A subsequent step 50 relates to a calibrating movement performed, as in step 20 but for the foreground.

In step 60 following step 50, the foreground error is minimized by means of a parallel movement, i.e. horizontally as well as vertically.

In a step 70 following step 60, again waiting for the background conditions is carried out with a subsequent check of the residual error.

Upon meeting all parameters, after that in a step 80 the presence of an optimum alignment is determined. Unless this presence of an optimum alignment is given, again step 30 is run through, wherein furthermore step 50 can be skipped.

Figure 2:
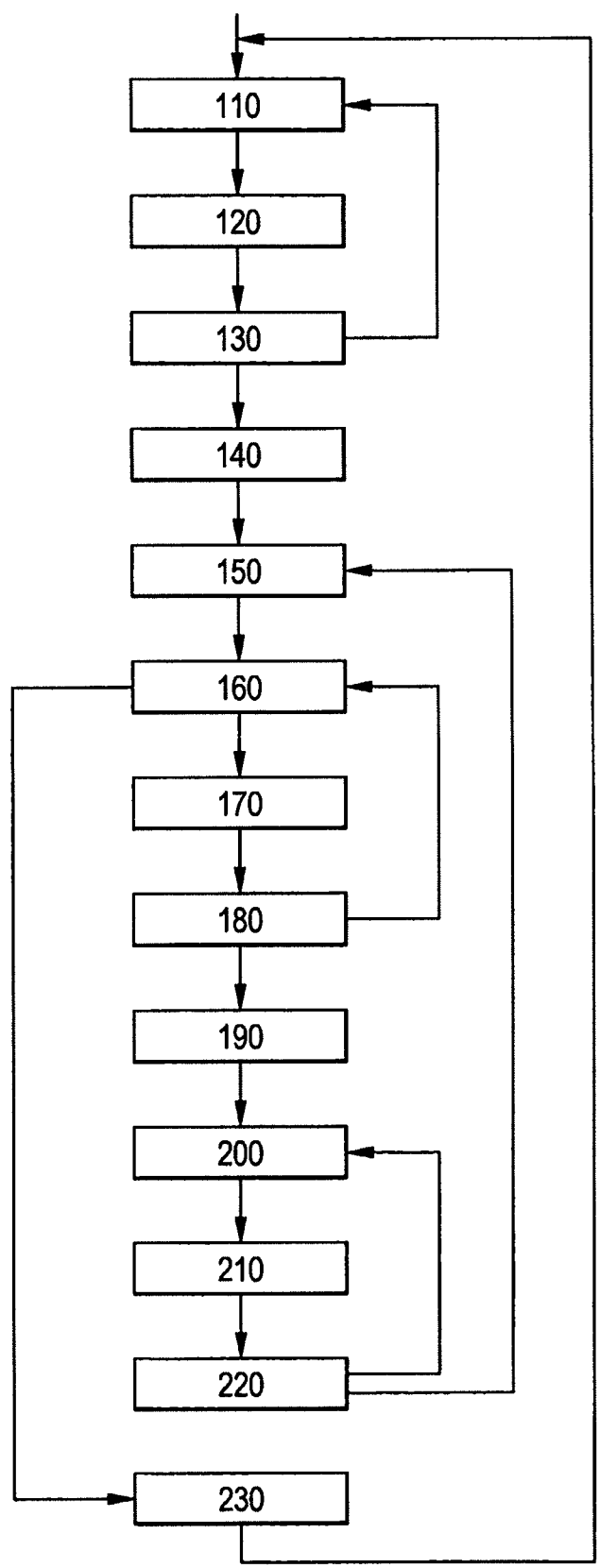
FIG. 2 shows a detail of the method according to the invention in a further flow chart.

In FIG. 2 the steps 30 to 80 are shown in more detail. A partial object solved by the sequence shown in FIG. 2 can also be perceived in correcting the so-called "zoom error".

In a step 110 the zoom error is determined. In a subsequent step 120 the motors are controlled. The motors are controlled until the zoom share of the offset existing between the two images, i.e. the offset of the individual pixels occurring due to the change of focal length is almost zero. This is due, inter alia, to the fact that, caused by manufacture, the lenses used in the two cameras do not have exactly the same focal length even if the same zoom stage is set.

In a step 130 following step 120, it is checked whether the residual error is approximately zero. If the residual error is approximately zero, a step 140 is run through. If the residual error is larger than a predetermined threshold, it is reset to step 110 again.

In a subsequent step 150 the focus is set to the distance. After that in the subsequent step 160 the alignment error is determined. The motors or at least one of the motors is moved in step 170 and in turn the alignment error is determined in the subsequent step 180. As long as a particular preset error is exceeded, it is skipped back to step 160. Otherwise step 190 follows in that the focus is set to the vicinity. Now the alignment error is determined again in the subsequent step 200. In the following step 210 the motors or at least one of the motors is controlled so as to minimize the alignment error. Subsequently, in a step 220 again the still existing residual deviation with respect to the alignment is detected and upon exceeding a predetermined limit again step 200 is run through.

If the predetermined limit is gone below, step 150 is run through again, wherein, if in step 160 the lack of an alignment error is determined, step 230 follows. In step 230 then the next zoom step is set and the sequence 110 to 230 is repeatedly run through until all zoom steps have been passed through.

The invention claimed is:

1. A method of aligning the optical axes of two cameras, wherein the cameras are parts of a camera apparatus, the cameras have a total of at least four degrees of freedom and the cameras can be used for producing 3D films, comprising the steps of:
    setting a first focal length for a first zoom value at both cameras;
    roughly aligning the two cameras to a first arbitrarily chosen first image section having a high-contrast and diverse environment surrounding the cameras;
    automatically comparing one or more pixels of images obtained by the two cameras which are contained in the first image section to each other and one or more controlling motors connected to the cameras such that at least an alignment of the cameras along a vertical axis and/or a horizontal axis and/or in accordance with a rotation about one axis or both axes results in resembling images, as well as detecting and storing the achieved alignment of the two cameras with resembling images, as well as aligning the two cameras to a second image section which is closer or more remote from the first image section to the cameras, with automatically comparing the pixels of the images obtained by the two cameras contained in the second image section to each other and the one or more controlling motors connected to the cameras such that at least one alignment of the cameras along a vertical axis and/or a horizontal axis and/or in accordance with a rotation about one axis or both axes results in resembling images, as well as detecting and storing the achieved alignment of the two cameras with resembling images;
    re-aligning the cameras to another image section which is identical to the first and/or second image section or differs from the same, with a second focal length which is different from the first focal length; and
    repeatedly carrying out the automatically comparing step.

2. The method according to claim 1, wherein at least one step comprises identifying individual recognizable pixels combined into features.

3. The method according to claim 2, wherein a Harris detector is used.

4. The method according to claim 2, wherein the features are specified by descriptors containing additional information, wherein the additional information comprises vectors and matrices for calculating and comparing the features in both images obtained by the cameras.

5. The method according to claim 4, wherein the descriptors of the two images are compared to each other.

6. The method according to claim 5, wherein upon exceeding a limit of inaccuracy in which a maximum deviation between the two descriptors is exceeded, the allocation of the respective feature of the two image sections is refused and a new allocation with respect to the two image sections is chosen.

7. The method according to claim 6, wherein a RANSAC technique is used for refusal.

8. The method according to claim 1, wherein the offset in the at least four degrees of freedom is stored after the overall correction in the automatically comparing step in a storage unit.

9. The method according to claim 1, wherein at least one step comprises determining a zero position in which deviations along the linear vertical axis and the linear horizontal axis as well as rotations about the vertical axis and the horizontal axis are detected.

10. The method according to claim 9, wherein a table of values of the absolute values established in the automatically comparing step is stored or in the table of values a difference of the values established in the automatically comparing step from the respective zero position is stored.

11. The method according to claim 10, wherein a camera rig comprising two cameras for producing 3D films is controlled according to the table of values, wherein during shooting upon zooming at least one camera is automatically moved via the one or more camera motors.

12. The method according to claim 1, wherein the method is executed using a camera rig comprising two cameras juxtaposed or superimposed.

* * * * *

UNITED STATES PATENT AND TRADEMARK OFFICE
CERTIFICATE OF CORRECTION

PATENT NO. : 9,503,707 B2  
APPLICATION NO. : 14/009793  
DATED : November 22, 2016  
INVENTOR(S) : Christian Wieland Page 1 of 1

It is certified that error appears in the above-identified patent and that said Letters Patent is hereby corrected as shown below:

In the Specification

In Column 1 at Line 5 (approx.), Above "FIELD OF THE INVENTION" insert --DESCRIPTION--.

Signed and Sealed this
Twenty-fifth Day of April, 2017

Michelle K. Lee
*Director of the United States Patent and Trademark Office*